(12) United States Patent
Beausoleil et al.

(10) Patent No.: US 7,546,004 B2
(45) Date of Patent: Jun. 9, 2009

(54) PHOTONIC INTERCONNECT SYSTEM

(75) Inventors: Raymond G. Beausoleil, Redmond, WA (US); Philip J. Kuekes, Menlo Park, CA (US); William J. Munro, Bristol (GB); Timothy P. Spiller, Bristol (GB); Richard S. Williams, Redwood City, CA (US); Sean D. Barrett, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/008,554

(22) Filed: Jan. 11, 2008

(65) Prior Publication Data

US 2008/0131047 A1   Jun. 5, 2008

Related U.S. Application Data

(62) Division of application No. 10/684,278, filed on Oct. 11, 2003, now Pat. No. 7,343,059.

(51) Int. Cl.
  *G02B 6/12* (2006.01)
  *G02B 6/26* (2006.01)
  *G02B 6/28* (2006.01)
  *G02B 6/35* (2006.01)
  *G02B 6/293* (2006.01)
  *G02F 1/295* (2006.01)

(52) U.S. Cl. .............................. 385/14; 385/4; 385/16; 385/24

(58) Field of Classification Search .................. None
  See application file for complete search history.

(56) References Cited

U.S. PATENT DOCUMENTS

| | | | |
|---|---|---|---|
| 4,941,205 A | 7/1990 | Horst et al. | |
| 5,069,517 A * | 12/1991 | Kersten et al. | ............. 385/130 |
| 5,202,567 A | 4/1993 | Hamanaka | |
| 5,287,107 A | 2/1994 | Gampell et al. | |
| 5,359,449 A * | 10/1994 | Nishimoto et al. | .......... 398/198 |
| 5,390,042 A | 2/1995 | Ito et al. | |
| 5,400,419 A | 3/1995 | Heinen et al. | |
| 6,310,991 B1 | 10/2001 | Koops et al. | |
| 6,670,631 B2 * | 12/2003 | Kornilovich et al. | .......... 257/40 |
| 6,804,283 B2 | 10/2004 | Scherer | |
| 7,155,078 B2 | 12/2006 | Welch et al. | |
| 7,181,120 B2 * | 2/2007 | Sugitatsu et al. | ............ 385/131 |

(Continued)

FOREIGN PATENT DOCUMENTS

EP   1136853   9/2001

OTHER PUBLICATIONS

Patent Abstracts of Japan—vol. 018 No. 661 (E-1644) Dec. 14, 1994.

(Continued)

*Primary Examiner*—Michelle R Connelly Cushwa

(57) ABSTRACT

A photonic interconnect system avoids high capacitance electric interconnects by using optical signals to communicate data between devices. The system can provide massively parallel information output by mapping logical addresses to frequency bands, so that modulation of a selected frequency band can encode information for a specific location corresponding to the logical address. Wavelength-specific directional couplers, modulators, and detectors for the photonic interconnect system can be efficiently fabricated at defects in a photonic bandgap crystal. The interconnect system can be used for both classical and quantum information processing.

13 Claims, 8 Drawing Sheets

U.S. PATENT DOCUMENTS

| | | |
|---|---|---|
| 7,189,988 B2 | 3/2007 | Hartwich et al. |
| 2001/0031109 A1 | 10/2001 | Paniccia et al. |
| 2002/0009277 A1* | 1/2002 | Noda et al. .................. 385/130 |
| 2003/0142719 A1 | 7/2003 | Fan |
| 2004/0081388 A1* | 4/2004 | Koyama ...................... 385/16 |
| 2004/0115696 A1 | 6/2004 | Heller |
| 2004/0150873 A1* | 8/2004 | Pearsall ...................... 359/321 |
| 2005/0025409 A1 | 2/2005 | Welch et al. |
| 2005/0059167 A1 | 3/2005 | Vitaliano et al. |
| 2007/0183738 A1 | 8/2007 | Welch et al. |

OTHER PUBLICATIONS

Jain et al—"Porous Silica Materials as Low-K Dielectrics for Electronic and Optical Interconnects" —Elsevier—vol. 398-399—Nov. 2001.

* cited by examiner

PHOTONIC INTERCONNECT SYSTEM

CROSS-REFERENCE TO RELATED APPLICATION

This application is a divisional of prior application Ser. No. 10/684,278, filed on Oct. 11, 2003, now U.S. Pat. No. 7,343,059, the contents of which are incorporated herein by reference. This application is also related to three divisional applications, filed on the same day as this application: (1) application Ser. No. 12/008,605, (2) application Ser. No. 12/008,531, and (3) application Ser. No. 12/008,618, the contents of each of which are also incorporated herein by reference.

BACKGROUND

Recent developments in integrated circuit technology have shown remarkable promise for reducing logic and memory circuits to nanoscale or molecular-scale. One architecture for nanoscale integrated circuits provides a "mosaic" or an electronically interconnected collection of small irreducible silicon or "moletronic tiles". Although the individual tiles are extremely compact, nanoscale circuits suffer from many of the same limitations of current microscale silicon circuits. In particular, the number of electronic interconnections between circuit units (e.g., between chips or internal circuit units) increases as the level of integration increases (i.e., as the feature size decreases). For example, according to Rent's Rule, the number $N_p$ of pins or external connections to a logic circuit is generally proportional to a power $\gamma$ of the number $N_g$ of gates in the logic circuit as indicated in Equation (1). In Equation (1), the proportionality constant $\kappa$ and the power $\gamma$ depend on architecture and implementation of the logic circuit. For most microprocessor architectures, for example, proportionality constant $\kappa$ in Equation (1) is typically between 1 and 2, and power $\gamma$ is between 0.5 and 0.6.

$$N_p = \kappa N_g^\gamma \tag{1}$$

FIG. 1 illustrates a typical architecture 100 for connection of a CPU 110 to random access memory (RAM) 130. In architecture 100, CPU 110 use/generates logical addresses that ultimately must be converted into a physical memory address identifying specific data locations in RAM 130. A multiplexer 120 must be designed to map the logical addresses from CPU 110 to physical addresses identifying the physical location of the bytes of RAM 130 being accessed. Ultimately, electrical wires in RAM 130 and between RAM 130 and multiplexer 120 must connect CPU 110 to every byte of RAM 120. In principle, stages of sub-multiplexers can be designed (each of which communicates with one multiplexer above and many below), but the buffering and switching that must be incorporated into any such architecture increases circuit complexity and limits the performance of the architecture 100 through increased resistance and capacitive delays.

Problems with architecture 100 get worse as components 110 and 130 shrink from micrometer to nanometer dimensions. In particular, as the gate counts increase, the number of interconnects required increases as indicated be Rent's Rule, i.e., Equation 1, and the interconnects require relatively more area. The size of external interconnects generally cannot be decreased below a minimum size required to make electrical connects to other devices or printing circuit, thus the size limitations of external interconnects fail to full advantage of the miniaturization advantages of moletronic devices. Further, the intrinsic capacitance of the multiplexing electronics having closely spaced lines for interconnections can greatly exceed that of moletronic circuit tiles within CPU 110 or RAM 130, and the interconnect impedance becomes a limiting factor to signal speed. Accordingly, an efficient architecture that provides fast interconnections of circuit units in a small circuit area is desired.

SUMMARY

In accordance with an embodiment of the invention, an interconnect system includes a first chip containing a modulator capable of modulating an output optical signal and a second chip containing a detector capable of detecting modulation of the optical signal to extract an information stream.

In accordance with another embodiment of the invention, a system includes a first device containing locations that are separately accessible, a second device that generates a logical address identifying one of the locations, a converter capable of activating separate components of an optical signal; and an optical path from the converter to each of the locations. The components of the optical signal respectively correspond to the locations in the second device, and in response to the logical address from the second device, the converter activates the frequency component that corresponds to the location that the logical address identifies. An optical decoder associated with the location can decode the optical signal.

In accordance with yet another embodiment of the invention, an interface for input/output from an integrated circuit, includes: a photonic bandgap crystal; a waveguide in the photonic bandgap crystal; a defect within the photonic bandgap crystal; and an electrical element adjacent the defect.

In accordance with still another embodiment of the invention, a method for transferring information between or among chips includes: modulating an optical signal in the first chip; transmitting the optical signal from the first chip to the second chip; and decoding modulation of the optical signal in the second chip.

BRIEF DESCRIPTION OF THE DRAWINGS

Use of the same reference symbols in different figures indicates similar or identical items.

DETAILED DESCRIPTION

In accordance with an aspect of the invention, an interconnection architecture suitable for microscale or nanoscale devices incorporates information for a target location into a frequency channel that corresponds to the target location. An optical signal incorporating one or more such frequency channels is transmitted on a waveguide to multiple circuit units. The circuit units respond to respective frequency channels, so that each circuit unit operates on the transmitted information for that circuit unit. An external light source can generate the original optical signal so that any of the circuit units send information to a target circuit unit by modulating the frequency channel corresponding to the target circuit unit. With this architecture, the number of interconnect lines for address and data signals can be reduced to a single optical signal line or waveguide, and optical signal lines replace relatively high capacitance electric signal lines.

In accordance with another aspect of the invention, modulators, detectors, and wavelength-specific directional couplers (e.g., add and drop filters) for optical interconnect systems can be efficiently fabricated at point defects in a photonic bandgap crystal. In particular, add filters, drop filters, photodiodes, and modulators can be formed at point defects that act as resonators for specific wavelengths. As a result, the photodiodes measure and the modulators modulate specific frequency channels corresponding to the wavelengths characteristic of the respective resonators.

Figure 1:
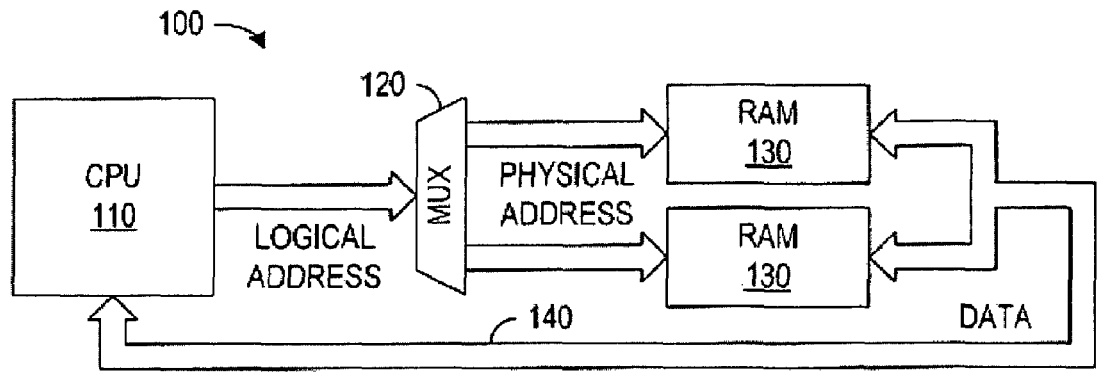
FIG. 1 is a block diagram of a conventional architecture for interconnecting circuit units such as a CPU and memory.
Figure 2A:
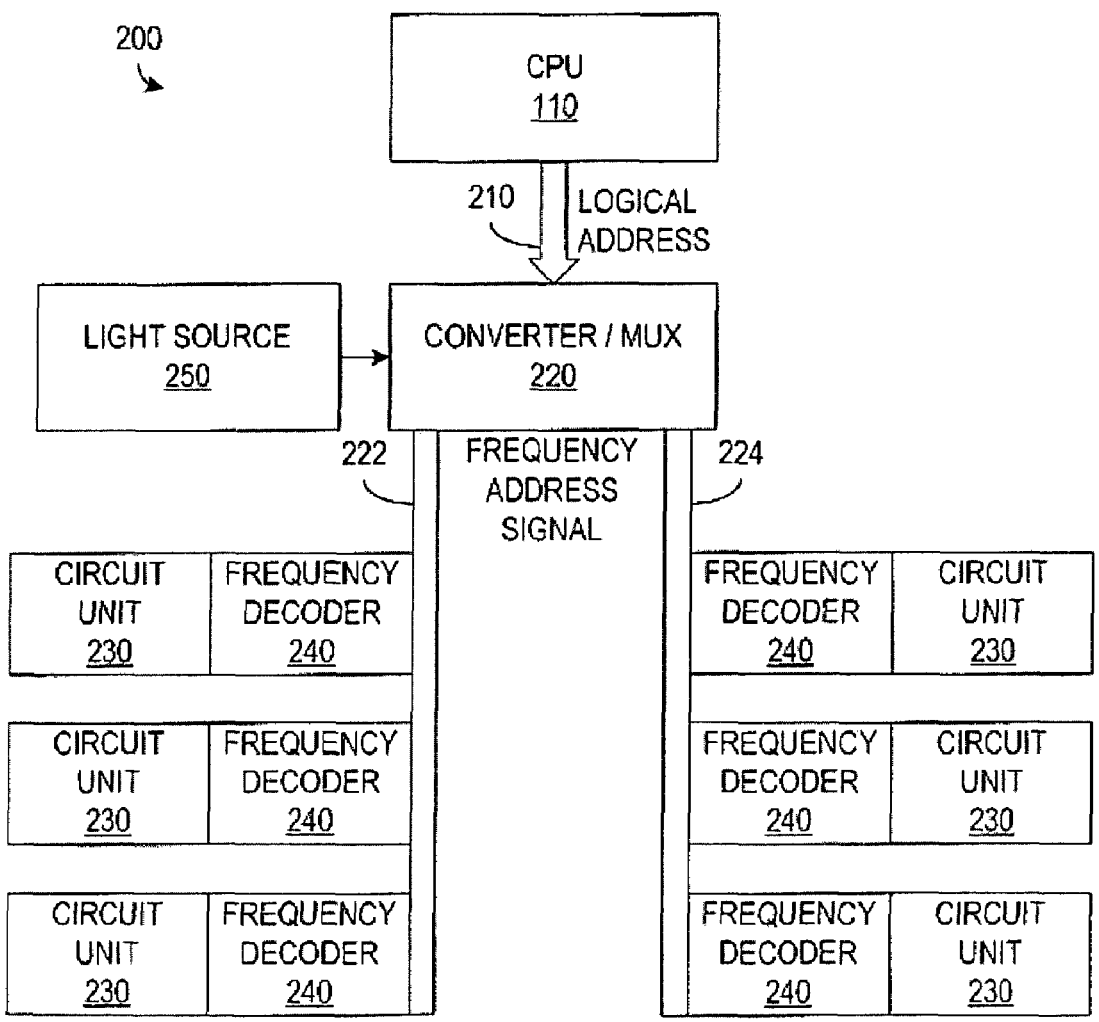
FIGS. 2A, 2B, and 2C are block diagrams of photonic interconnect architectures in accordance with alternative embodiments of the invention.

FIG. 2A shows an interconnect architecture 200 in accordance with an exemplary embodiment of the invention. In interconnect architecture 200, a CPU 110 accesses addressable circuit units 230 through a converter 220. To access a particular circuit unit 230, CPU 110 transmits a logical address signal to converter 220 via a signal bus 210. CPU 110 can be an electrical circuit of conventional or nanoscale design that generates the multi-bit logical address signal to identify a selected address location for an access (e.g., for a read or a write). Each circuit unit 230 can be a memory, sensor, or logic array or any other device having addressable locations that CPU 110 can access.

Converter 220 receives an optical signal from a light source 250, which in general can be external to a chip containing converter 220. Converter 220 selects from the optical signal a frequency channel corresponding to the value of the logical address signal and then modulates the selected frequency channel. Modulation of the selected frequency channel can encode information such as data for a write operation, an access type (e.g., read or write), or a local address for a target circuit unit 230. In an exemplary embodiment, the modulation toggles the intensity of the frequency channel between levels representing binary values 0 and 1 to create a serial data stream. Any desired protocol for the serial data stream can be employed, and in an exemplary embodiment, converter 220 uses Manchester encoding or differential Manchester encoding for the serial data stream. Converter 220 transmits an optical signal containing the modulated frequency channel on one or more waveguides 222 and 224 connected to the circuit units 230.

Each circuit unit 230 can contain multiple tiles (e.g., memory tiles) with each tile having its own local frequency decoding system 240. In an exemplary embodiment of the invention, each circuit unit 230 contains a molecular mosaic, but architecture 200 can be extended to microscale or nanoscale arrays of logic, memory, or sensors. In one embodiment of the invention, each frequency decoding system 240 uses a frequency "fingerprint" that is distinct from the frequency fingerprints of all other frequency decoding systems 240 in circuit units 230. Converter 220 can then send the optical signal in parallel to all circuit units 230, without regard for the physical location of the circuit unit 230 containing the location or locations being accessed, and only the frequency decoder 240 using a frequency fingerprint matching the modulated frequency channel decodes the serial data for use in the corresponding circuit unit 230.

In an alternative embodiment, the frequency fingerprints of frequency decoders 240 are distinct from the fingerprints for the other frequency decoders 240 coupled to the same waveguide 222 or 224, but frequency decoders 240 coupled to different waveguides 222 and 224 can use the same frequency fingerprint. When frequency decoders 240 coupled to different waveguides 222 and 224 have the same frequency fingerprint, converter 220 can send the optical signal only on the waveguide 222 or 224 corresponding to the circuit unit 230 identified by the logical address signal, but this technique requires that converter 220 be designed with some knowledge of the physical locations of circuit units 230.

The circuit unit 230 activated by a particular frequency channel performs the indicated access (e.g., read or write operation). For a write operation, the activated circuit unit 230 writes data extracted from the frequency channel. For a read operation, modulating a frequency channel returned to converter 220 can return the data read.

Figure 2B:
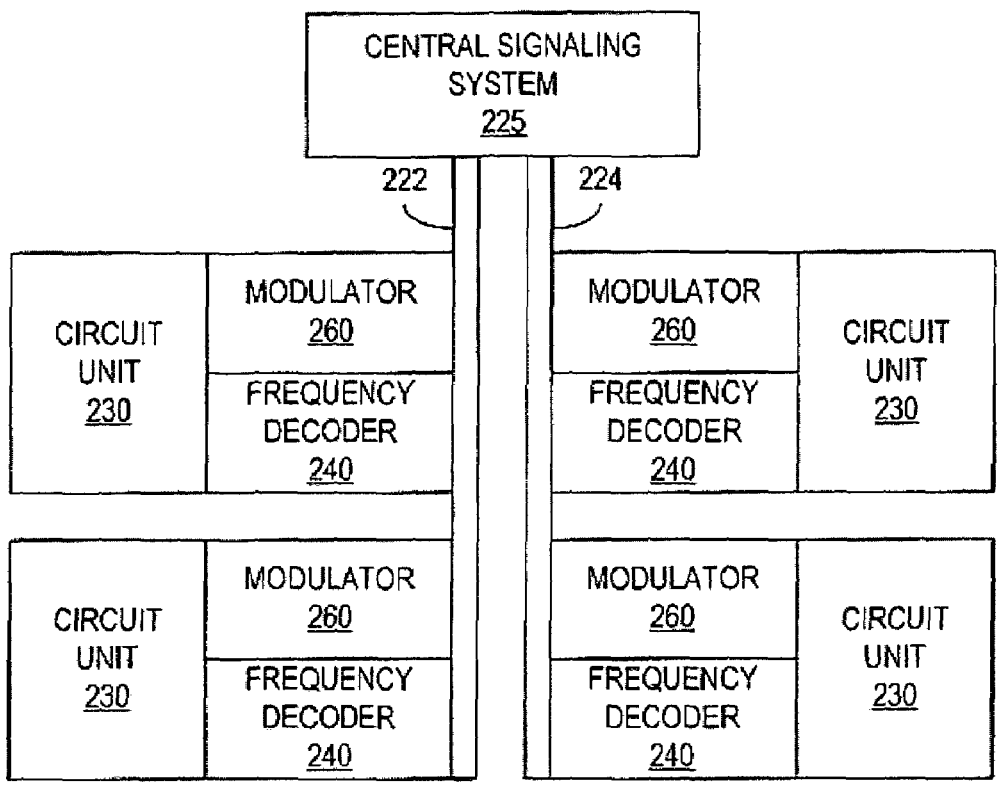

Interconnect architectures using the frequency of optical signals to identify circuit units are not limited to the example of a CPU communicating with memory. FIG. 2B illustrates an interconnection architecture in an embodiment of the invention where circuit units 230, which can be of the same or different types, communicate with each other via an optical waveguide 222 and 224 and a central signaling system 225. For the communications, each circuit unit 230 has a frequency decoding unit 240 and a modulator 260. The frequency decoding unit 240 and the modulator 260 for a circuit unit 230 use frequency fingerprints that uniquely identify the circuit unit 230. The frequency fingerprints for the decoding unit 240 and the modulator 260 in a circuit unit 230 can be but are not required to be the same, e.g., the modulator 260 for a circuit unit 230 can transmit an optical signal having the same frequency that the frequency decoder 240 for the circuit unit 230 decodes. Central signaling system 225 operates to receive a frequency signal modulated in a sending circuit unit 230 and retransmit the information encoded in that signal in a frequency signal with the fingerprint of a target circuit unit 230.

Figure 2C:
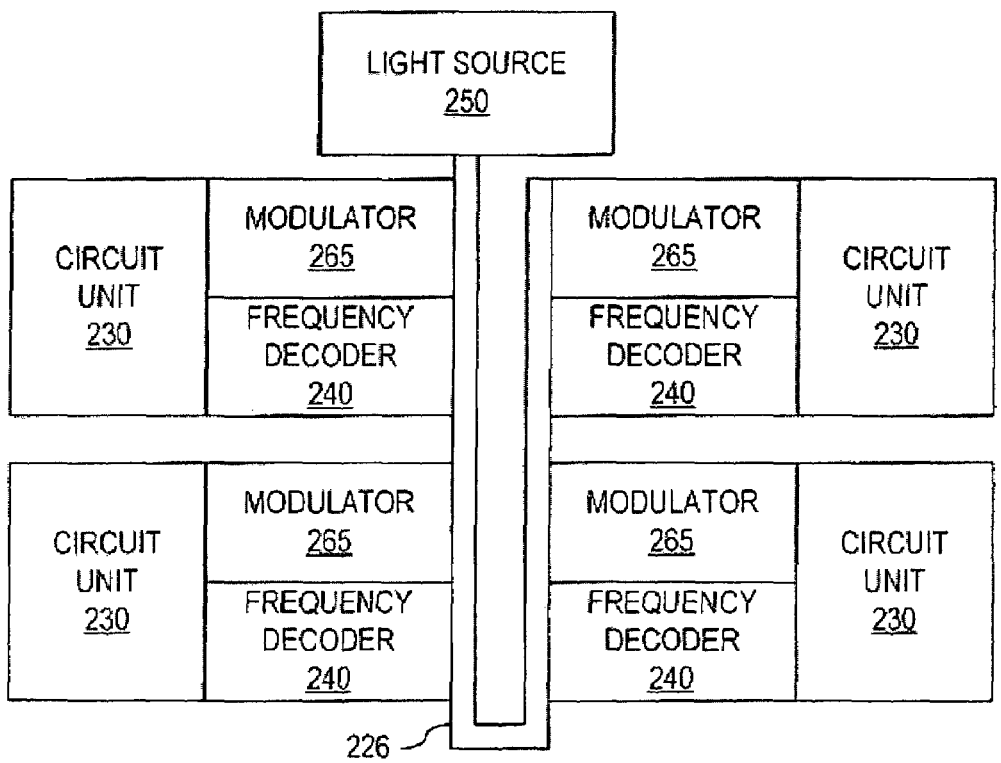

FIG. 2C illustrates yet another architecture in which circuit units 230 communicate with each other using frequency signals directly transmitted via a waveguide 226. For the interconnect architecture of FIG. 2C, external light source 250 drive optical signals on waveguide 226, and each circuit unit 230 has a modulator 265 that is capable of modulating any of the frequencies corresponding to the frequency fingerprints of the frequency decoders 240 of the other circuit units 230.

Waveguides 222, 224, and 226 can generally provide a two-way optical connection between circuit units 230 either directly as in architecture of FIG. 2C or through a central signaling system 225 as in architecture of FIG. 2B. These optical interconnects operate at the group velocity of light in the material of the waveguides, providing high performance. This approach also removes or reduces the proliferation of interconnects suggested by Rent's Rule by effectively using a single optical signal line for address and data signals. Since circuit units 230 associate each frequency fingerprint with a specific circuit unit 230 that can be anywhere on the communication waveguides, circuit units 230 can operate without any specific information regarding the physical location of the other circuit units 230. As long as every circuit unit 230 has access to the full data stream, each circuit unit 230 can extract and process the relevant information.

Figure 3A:
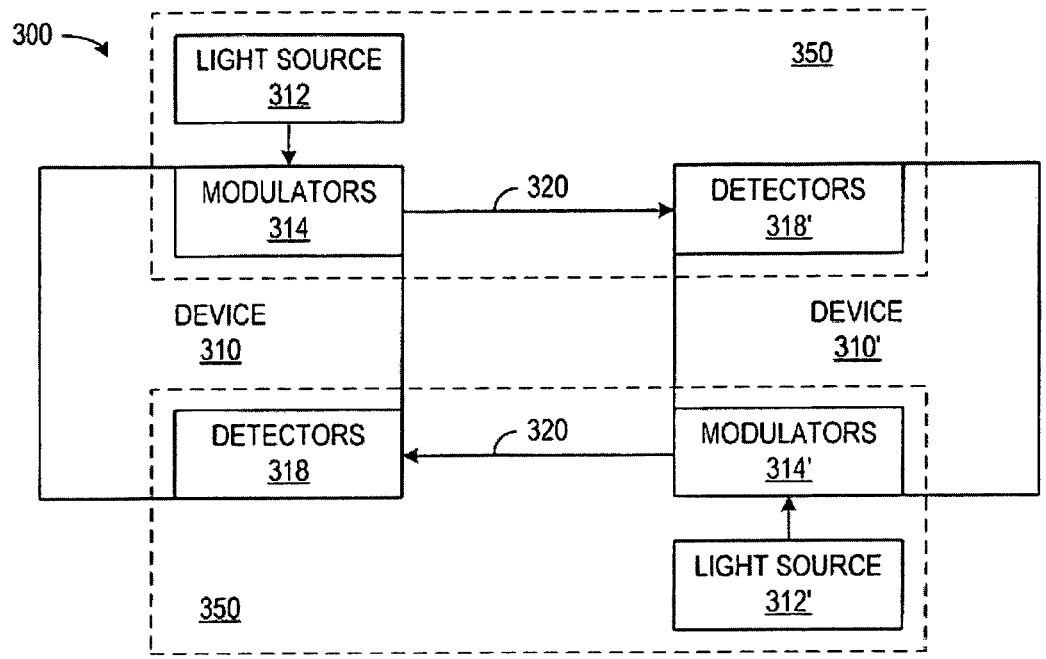
FIGS. 3A and 3B illustrate photonic interconnect systems for chip-to-chip communication in accordance with alternative embodiments of the invention.

The communications architectures of FIGS. 2A, 2B, and 2C can be used with an integrated circuit or between integrated circuit chips. FIG. 3A shows a conceptual architecture of a nanophotonic interconnect system 300 for chip-to-chip communication between devices 310 and 310' using optical fibers or other photonic paths 320. Devices 310 and 310' generally implement different functions but have optical I/O interfaces including modulators 314 and 314' and photodetectors 318 and 318' suitable for photonic communications. In the illustrated embodiment, devices 310 and 310' are semiconductor integrated circuits that are preferably fabricated on silicon dies. Since lasers and other sources of optical signals are typically difficult to fabricate on silicon, off-chip light sources 312 and 312' respectively provide the optical power that devices 310 and 310' uses in their respective output signals. Each light source 312 or 313' may for example be a GaAs laser diode.

Alignment for transmission of optical signals can be achieved by mounting communicating optical components such as light source 312, modulators 314, and detectors 350 into an assembly on a single substrate (e.g., a plastic board). Another optical assembly 350 includes light source 312', modulators 314', and detectors 318. Both devices 310 and 310' can be fabricated to include index guides that match pins on optical assemblies 350. Accordingly, after fabrication of optical assemblies 350 aligned for communication of the optical signals, optical assemblies 350 are mounted on and electrically connected to devices 310 and 310'.

The light source 312 for device 310 is preferably a laser that is mode-locked to provide a beam containing one or more frequencies that detectors 318' in device 310' decode. Similarly, the light source 312' for device 310' is preferably a mode-locked laser that provides a beam containing one or more frequencies that detectors 318 in device 310 decode. Each on-chip modulator 314 or 314' imprints information onto one or more frequency component of the optical stream from the corresponding light source 312 or 312' and transmits the optical signal. One or more waveguides 320 direct the optical signals to the detector 318' or 318 in the receiving chip 310' or 310. The receiving chip decodes this information using a separate photodetector for each frequency channel used.

Figure 3B:
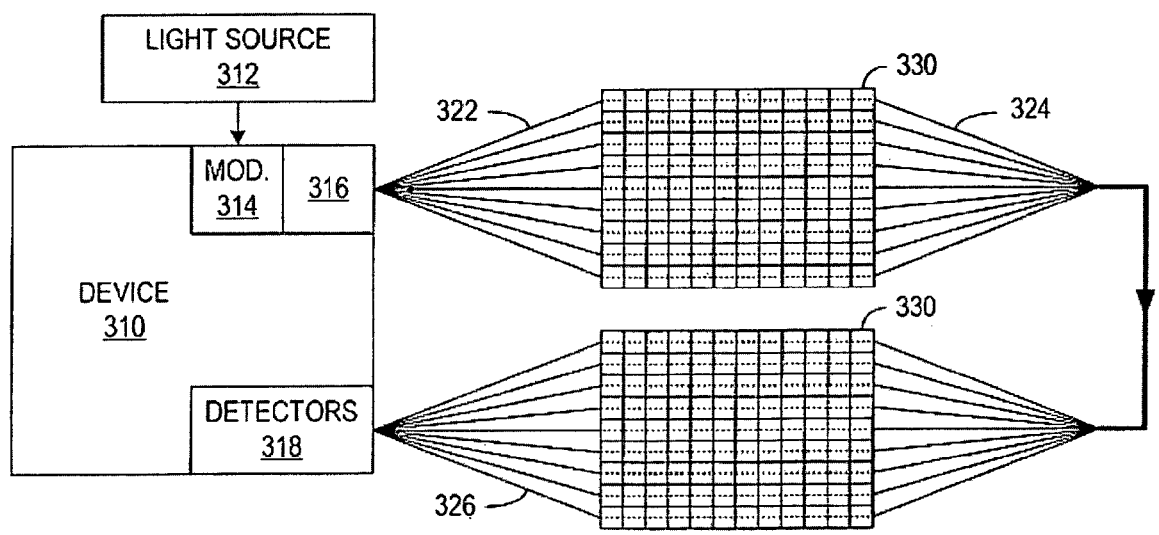

FIG. 3B shows another conceptual architecture of a nanophotonic interconnect system for chip-to-chip communication between a master chip 310 and series of chips 330. In an exemplary embodiment of the system of FIG. 3B, chip 310 implements processing or other functions that require access to memory or logic arrays in chips 330. In this architecture, light source 312 preferably provides a beam containing a series of different frequencies that correspond to different locations in chips 330. Modulator 314 receives the beam from light source 312 and modulates a frequency component corresponding to a location being accessed in chips 330. The modulation can serially encode information for the location being accessed.

Optical elements 316 (e.g., such as a network of 3 dB couplers) split the output optical signal emerging from chip 310 into waveguides 322, and each waveguide 322 provides the optical signal containing encoded data in parallel to all nanocircuit tiles in the arrays on chips 330. In the embodiment of FIG. 3B, waveguides 324 connect chips 330 in series and relay the optical signal sequentially through chips 330. Each tile in chips 330 samples the optical signal, disambiguates the contents, extracts any instructions or data intended for that particular tile, and then, through a local electronic circuit performs a requested action (e.g., either reads or writes data in that tile.)

The accessed tile in chips 330 can modulate a frequency or frequencies of the beam that are selected for communications to chip 310. The beam components modulated in chips 330 pass through the remainder of chips 330 and into waveguides 326 leading to a detector 318 in chip 310. Detector 318 demodulates the incoming frequency signal to extract any data or information for chip 310.

The high degree of parallelism available through techniques illustrated in FIG. 3B can be efficiently applied to large quantities of RAM (exceeding 1 GB) in chips 330 accessed at data rates of 100 Gb/s or more, or logic capable of operating at similar rates. The power that light source 312 expends creating photons is the price paid for the high performance.

Figure 4A:
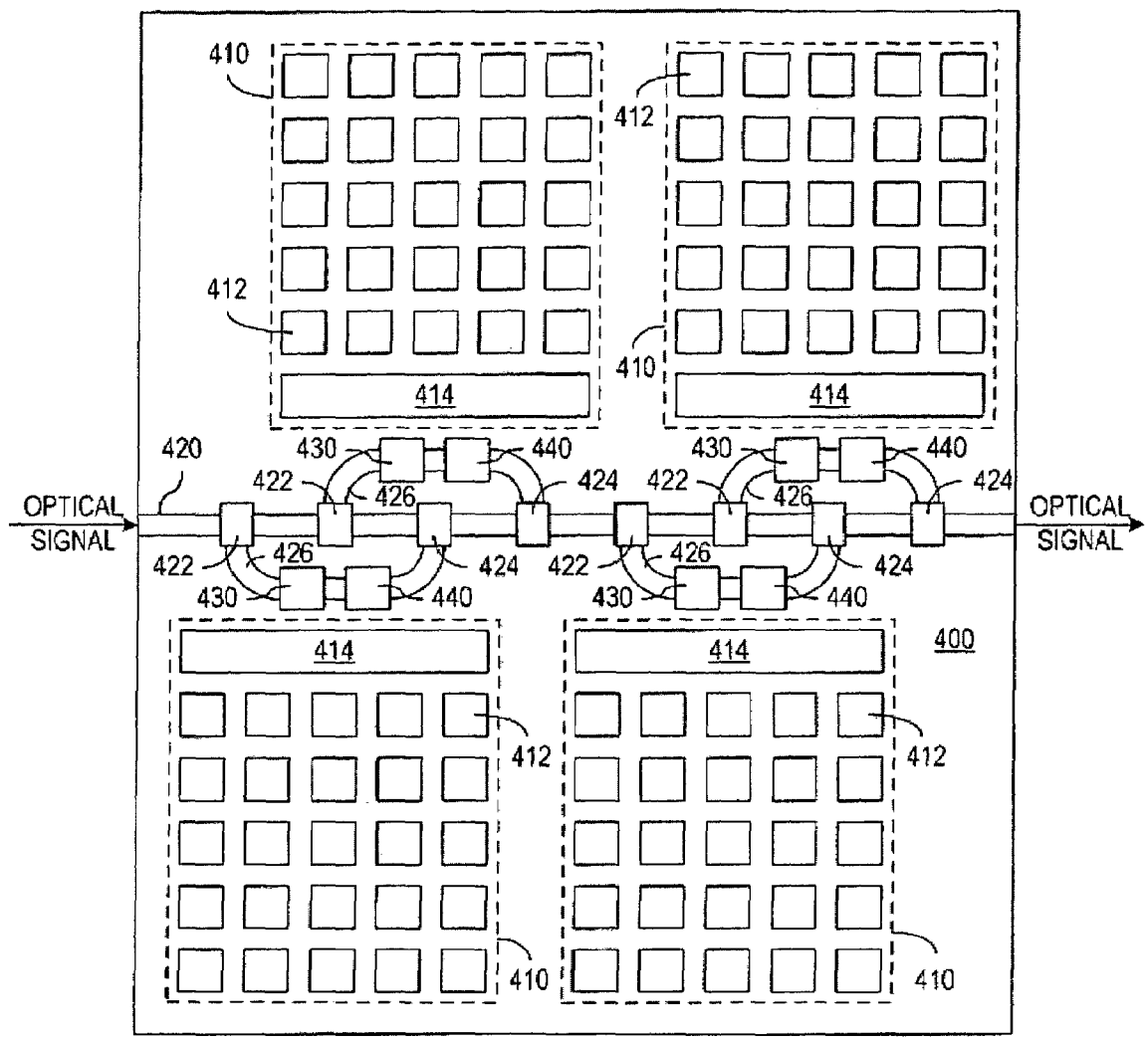
FIGS. 4A and 4B are block diagrams of integrated circuits containing optical I/O systems in accordance with embodiments of the invention a combined I/O waveguide or separate input and output waveguides.

FIG. 4A schematically illustrates an integrated circuit 400 in accordance with an embodiment of the invention including photonic interconnect components with interfaces to mosaics, for example, of molecular memory, logic, or sensors. In particular, integrated circuit 400 includes a set of moletronic mosaics 410 and a waveguide 420 for communications with moletronic mosaics 410. Each moletronic mosaic 410 contains an array of moletronic tiles 412 and an interface 414 for transmission of electrical signals between selected moletronic tiles 412 and the photonic interface that includes a photodetector 430 and a modulator 440 associated with the mosaic 410.

Waveguide 420 receives an optical signal that may encode data for moletronic tiles 412. A preferred embodiment of IC 400 employs wavelength-division multiplexing (WDM), although other data multiplexing techniques might be used instead. (See R. Ramaswami and K. N. Sivarajan, Optical Networks: A Practical Perspective, 2/e, Academic Press, 2002.) WDM divides an optical signal into "virtual fibers" or frequency channels that may be separately encoded. In IC 400, wavelength-specific directional couplers 422 and 424 referred to herein as drop filters 422 and add filters 424 can extract or add a frequency channel in the optical signal in waveguide 420.

In operation, the light source (not shown) for IC 400 preferably includes one or mote mode-locked lasers that provide an optical signal containing many narrow-band coherent channels. Each mosaic 410 corresponds to a different channel, and information for each mosaic 410 is encoded onto a specific frequency channel by modulating the light at that the wavelength of the channel over a bandwidth that is smaller than the frequency separation between adjacent channels. The optical signal containing the frequency channels, one or more of which may be modulated to represent data, is input to waveguide 420.

Each moletronic mosaic 410 in IC 400 has a drop filter 422 that extracts from waveguide 420 the frequency channel corresponding to the mosaic 410. Each drop filter preferably shunts a larger fraction (approaching 100%) of the power at that frequency channel's wavelength onto a local waveguide 426. The photodetector 430 for the moletronic mosaic 410 then measures the modulated frequency channel and generates an electrical signal representing a serial binary data stream, and interface 414 can convert the serial data to parallel data for use in the mosaic 410. Alternatively, the modulator 440 for the moletronic mosaic 410 can modulate the extracted frequency channel to encode information from the moletronic mosaic 410 and then inject the modulated frequency channel back into waveguide 420 via the add filter 424 for the moletronic mosaic 410.

Interface 414 may use both a data stream and a separate clock stream to encode the input. For example, a Non-Return to Zero (NRZ) data stream and a separate NRZ clock with a rising edge occurring in the middle of each NRZ data bit. Alternatively, Manchester encoding may be used to combine the clock and synchronous data into one serial data stream. A Manchester data stream is generally an NRZ data stream exclusive NORed with an NRZ clock stream. These and other coding methods are well known and often used to transmit serial data. One example implementation of 414 would use a Digital Phase Locked Loop (DPLL). A DPLL circuit may consist of a serial shift register which receives digital input samples from the photodetector 420, a stable local clock advancing the shift register, and a phase adjustment circuit that creates a sampling clock in-phase with the received data by slowly adjusting the phase the sampling clock so as to match the received signal. The DPLL is used in Manchester encoding to separate (regenerate) the clock signal from the received data.

Figure 4B:
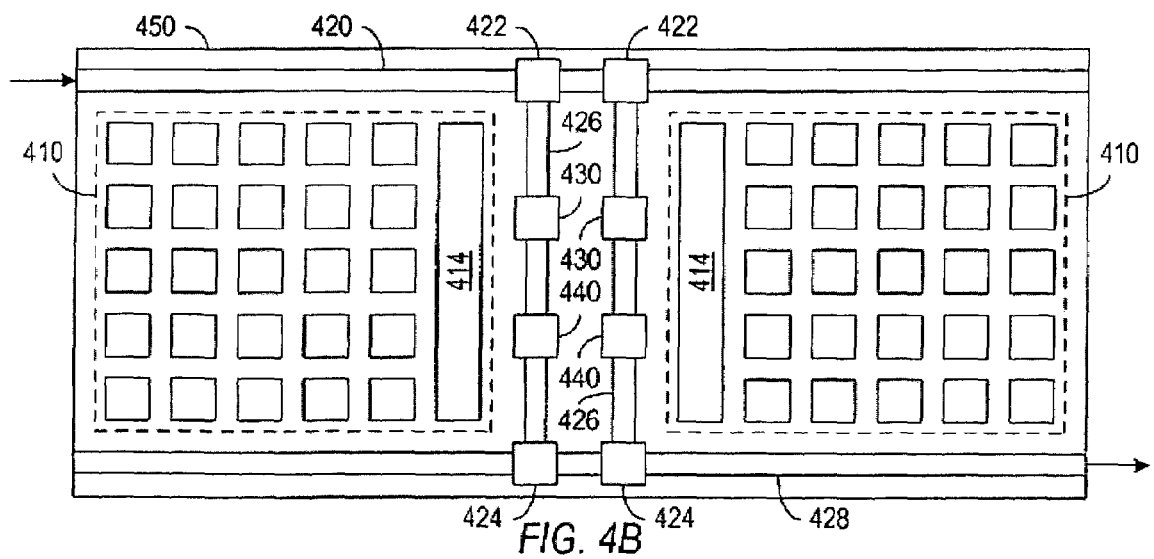

A potential concern for IC 400 is backscattering at add-filters 422 and drop filters 424. FIG. 4B shows an integrated circuit 450 that is similar to IC 400 of FIG. 4A but contains an output waveguide 428 that is separate from the input waveguide 420. As in IC 400, drop filters 422 extract the frequency channels for respective moletronic mosaics 410 from waveguide 420 direct the frequency channel onto a local waveguide 426. A photodetector 430 can then measure the frequency channel intensity, or a modulator 440 can modulate the extracted frequency channel to represent transmitted information. IC 450 differs from IC 400 in that add-filters 424 inject the modulated frequency channel onto output waveguide 428, reducing the potential back scattering concerns.

The structure of IC 400 including a single waveguide 420 or the structure of IC 450 including separate input and output waveguides can be repeated to create a device including multiple waveguides and any desired number of mosaics 410. The separate waveguides may be (but are not required to be) connected to each other either internally or externally to the resulting integrated circuit.

Figure 5:
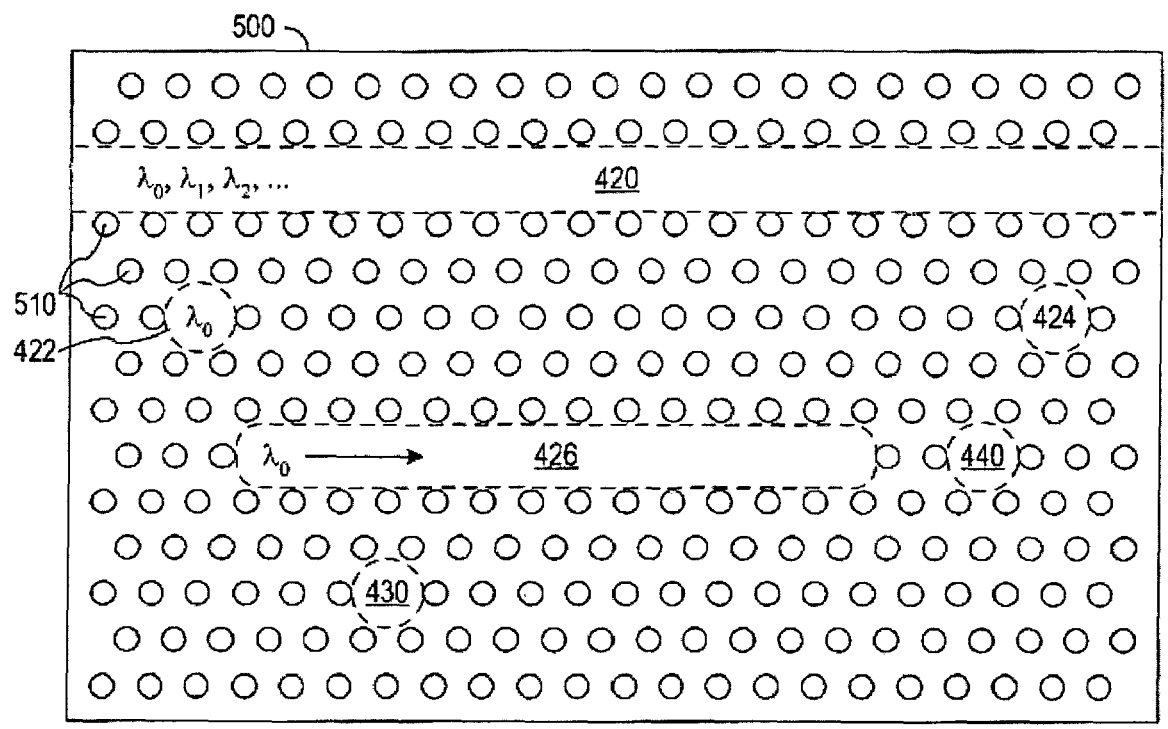
FIG. 5 shows a photonic bandgap crystal containing components of optical I/O system suitable for use in the integrated circuit of FIG. 4A.

In accordance with an aspect of the invention, drop filters 422, add filters 424, photodetectors 430, and modulators 440 such as illustrated in FIG. 4A can be constructed within a surrounding photonic bandgap crystal (PBC) 500 as illustrated in FIG. 5. In the specific embodiment of FIG. 5, PBC 500 contains holes 510 containing a material (e.g., air) having a refractive index that differs from the refractive index of the surrounding material. The size and pattern of holes 510 and the material in or surrounding holes 510 can be selected to prevent propagation of photons having the wavelengths in the optical signal propagating along waveguide 420. More generally, PBC 500 relies on periodic spatial variations in refractive index to confine propagation of light to waveguide 420 except where defects in PBC 500 (e.g., changes in the pattern of holes 510) permits coupling of the optical signal into or out of waveguide 420.

A PBC formed using holes 510 would typically have holes that have diameters and separations on the order of a few hundred nanometers or less. Dry etching, nanoimprint lithography, or other processing methods can be used to create holes 510 in a suitable material. Generally, the size and relative spacing of holes 510 control which wavelengths of light are prohibited from propagating in PBC 500. (See J. D. Joannopoulos, R. D. Meade, and J. N. Winn, Photonic Crystals: Molding the Flow of Light, Princeton University Press, 1995, and K. Sakoda, Optical Properties of Photonic Crystals, Springer, 2001.) Defects can be introduced into the lattice of holes 510 to produce particular optical components. In particular, a point defect can form a resonator, and a line defect can form a waveguide. The transverse mode diameter of an optical field propagating along a PBC waveguide can be as small as $\lambda/3n$, while the mode volume of a PBC resonator can be as small as $2(\lambda/3n)^3$, where $\lambda$ is the wavelength of the light and n is the refractive index of the waveguide.

In PBC 500, a drop filter 422 or an add filter 424 is implemented by a point defect (e.g., an absence of holes 510) within the evanescent fields surrounding waveguide 420. The defect has a size and separation from waveguide 420 selected to act as a resonator for a specific wavelength $\lambda_0$ or equivalent frequency $v_0$. During the fabrication process for PBC 500, adjusting either the refractive index of the material in or the spacing and/or size of the lattice of holes 510 can tune the resonant frequency $v_0$ of the resonators 422 and 424 in the PBC 500 to any of the frequencies transmitted on waveguide 420.

To provide strong couplings, drop filter 422 or add filter 424 preferably has a high Q factor (e.g., 1,000 or more). The Q factor of the resonator can be modeled using finite-difference time domain numerical methods as described by K. Srinivasan and O. Painter, "Fourier space design of high-Q factor cavities in standard and compressed hexagonal lattice photonic crystals," Optics Express 11, 579 (2003). Predictions of PBC resonators with Q factors greater than $10^5$ have been published.

The resonant transmission bandwidth of a resonator with quality factor Q and resonant frequency $v_0$ is $\pi v_0/Q$ or about 500 THz/Q for light with a 1-μm wavelength. The resonant power transmission fraction to this resonator is $1-1/Q$, and the non-resonant insertion loss of the resonator is $1/Q$, assuming a configuration similar to that shown in FIG. 5, where non-resonant light can propagate freely along waveguide 420. Generally, the frequency $v_0$ and the modulation bandwidth B for a frequency channel are preferably such that resonant transmission bandwidth $\sigma v_0/Q$ is greater than modulation bandwidth B. In this case, the fraction $1-1/Q$ of the light in the frequency channel at wavelength $\lambda_0$ that will be redirected and transmitted through drop filter 422 is identical the fraction of the light at other wavelengths $\lambda_1, \lambda_2, \ldots$ that will continue to propagate along waveguide 420. Therefore, as a design choice, the number of nanophotonic interconnects (i.e., drop/add filter pairs) can be restricted to less than Q/2, so that the total non-resonant signal loss, which is $1-(1-1/Q)^Q$ from waveguide 420, will be less than $e^{-1}$ or 63%. This choice guarantees that the last drop/add filter pair 422/424 on waveguide 420 can extract at least 37% of the light originally entering waveguide 420 at the corresponding wavelength of the pair. Other choices are possible given different design goals.

Local waveguide 426 is line defect positioned to provide a strong coupling to drop filter 422 so that a large fraction $(1-1/Q)$ of the power coupled into drop filter 422 propagates through local waveguide 426. Photodetector 430 and modulator 440 are sized and positioned to capture photons from local waveguide 426. Modulator 440 is also position to create a strong resonant coupling to add filter 424, so that add filter 424 feeds the optical signal from modulator 440 back into waveguide 420.

PBC system of FIG. 5 can be repeated for each mosaic 410 in IC 400 of FIG. 4A. For each repetition of PBC, the resonant frequency of the point defects (e.g., drop and add filters 422 and 424) differs from the resonant frequency of the point defects in other repetitions so that each mosaic 410 has a different frequency fingerprint. Such differences can be achieved by varying the properties of PBC 500 such as the hole size and/or spacing or the chemical composition gradually across the IC 400.

Figure 6A:
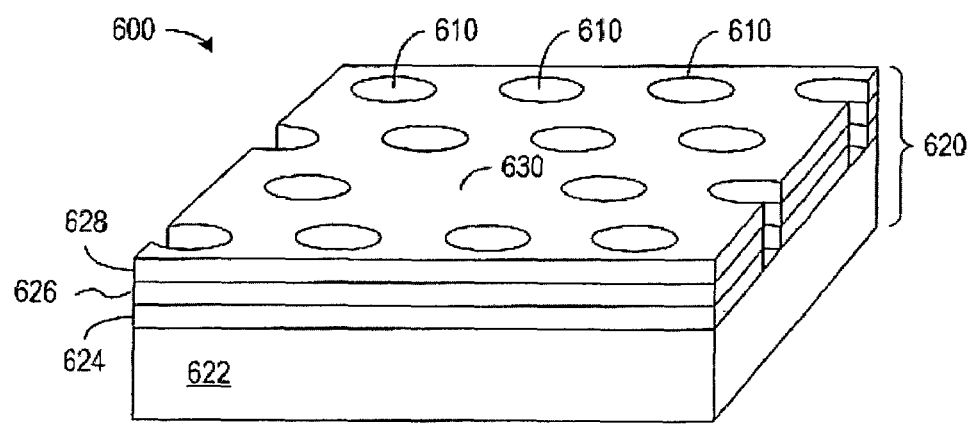
FIGS. 6A, 6B, and 6C illustrate structures suitable for forming an add filter, a drop filter, a detector, or a modulator in a photonic bandgap crystal.

Add filters 422, drop filters 424, photodetectors 430, and modulators 440 can be constructed in PBC 500 through proper selection of the materials using a variety of techniques. FIG. 6A illustrates an add or drop filter 600 in a two-dimensional photonic bandgap crystal (PBC) created by holes 610 in a material 620. The pattern of holes 610 generally prohibits propagation of light having the wavelengths used in the optical signal except in a defect area 630. As described above for drop filter 422 and add filter 424, the size, position, and material in and around area 630 can create a high-Q factor resonator for a selected wavelength $\lambda_0$.

Figure 6B:
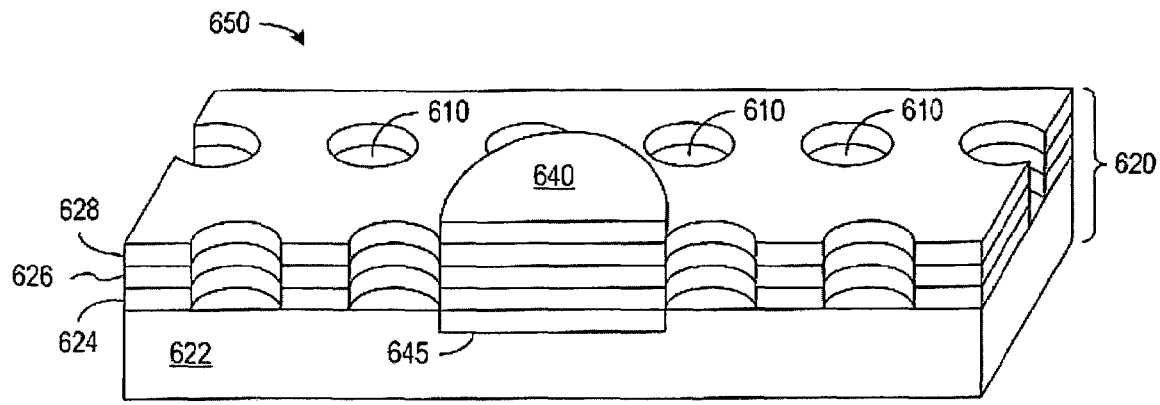

FIG. 6B illustrates a structure 650 suitable for a photodetector. To make photodetector 650 from the resonator area 630 (which is hidden under electrode 640 in FIG. 6B), material 620 includes a semiconductor material (e.g., a p-i-n structure formed using Si or InGaAs). More specifically, in the illustrated embodiment, material 620 includes a first semiconductor layer 624 on a substrate 622, an insulating layer 626 on the first semiconductor layer 624, and a second semiconductor layer 628 on insulating layer 626. The two semiconductor layers 624 and 628 have different doping (e.g., different dopant concentrations or dopant types) so that the structure can operate as a photodiode. The thicknesses and dopant concentrations of these layers can generally be the same as conventionally used to construct a photodiode. To complete the photodiode, electrodes 640 and 645 respectively contact layers 624 and 628 in the point defect 630 and collect a current that depends on the intensity of light in the point defect area 630. Electrodes 640 and 645 can be electrically connected to a circuit unit such as interface 414 of FIG. 4A.

Structure 650 is also suitable for a modulator where a change in an electrical signal (e.g., an applied voltage) on electrodes 640 and 645 changes a refractive index in the point defect 630. As a result, changing the applied voltage causes a change in the phase of the frequency signal in the resonator created by the point defect. This electrically controllable phase change can be used for frequency modulation or amplitude modulation of the optical signal passing through point defect 630.

Figure 6C:
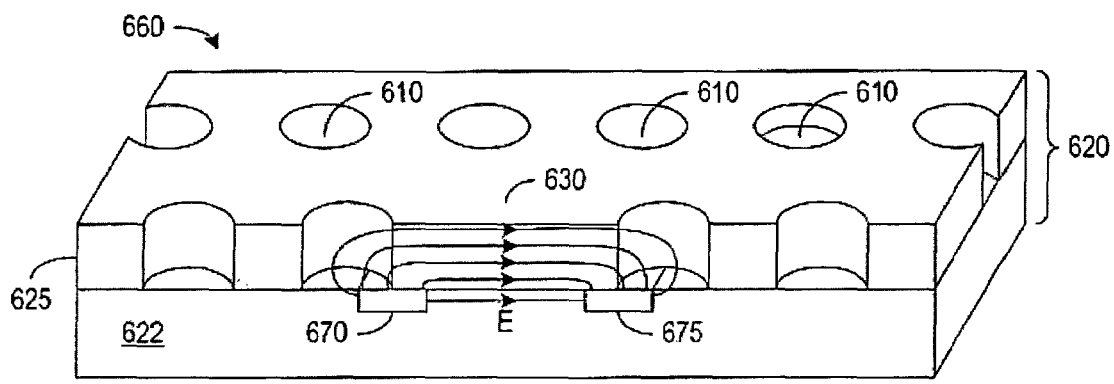

FIG. 6C illustrates a structure 660 for a modulator such as modulator 440. Structure 660 uses a point defect resonator that contains a material 625 such as a semiconductor material (e.g., a p-i-n structure) or lithium niobate (LiNbO$_3$) and electrode 650 and 655 that are both under the point defect but separated from each other. A voltage applied across electrodes 650 and 655 creates an electric field E that changes the refractive index in the point defect causing a phase change in the resonating optical signal. Variations of the applied voltage between electrodes 650 and 655 can thus be used for amplitude or frequency modulation of the optical signal.

The above structure for photodetector 430 and modulator 440 can be analyzed to improve the design for an integrated PBC. For example, the intrinsic capacitance of a silicon photodetector with an area of A square microns is approximately 0.1 A fF, while the transverse dimension of the photodetector shown in FIG. 6B is typically about 100 to 150 nm. Accordingly, the intrinsic capacitance of the doped region forming photodetector 430 is about 2 aF. This capacitance is low enough that the current fluctuations due to Johnson noise should be insignificant. Hence, the statistics of the light source should dominate the bit error rate (BER) arising in the serial digital signal corresponding to the output from the photodetector. If a Poisson distribution of photon number is assumed, 30 photons per bit will be sufficient to achieve a BER less than $10^{-13}$. The small size of the detector further implies that the fraction of the light absorbed by the active area of the detector will be quite small. Incorporating the doped region into a resonant cavity with a Q factor of 10 to 100 can compensate for the reduced absorption. M. K. Emsley, O. Dosunmu, and M. Selim Unlu in "High-Speed Resonant-Cavity-Enhanced Silicon Photodetectors on Reflecting Silicon-On-Insulator Substrates," IEEE Photonics Technology Letters 14, 519 (2002) indicate that such a resonant cavity enhancement method can dramatically increase the efficiency of broadband silicon photodetectors. With an appropriate choice of Q factor to impedance-match the optical input losses of the cavity to the internal absorption loss of the detector, an increase in the detection efficiency to 50% should be achievable.

Similar considerations can be applied to the design of a resonant cavity enhanced (RCE) modulator; using electro-optic techniques, modulation depths as high as 50% can be obtained if the resonator corresponding to the modulator has a Q factor greater than about 1,000. Although other physical effects can be employed (e.g., variations in the free carrier plasma index), electro-optic modulation 440 could use a potential difference of about 30 mV applied across a gap of about 300 nm to produce an electric field of 1 kV/cm, which is sufficient to generate a refractive index change as large as 0.001 in a wide variety of linear electro-optic materials.

The area of the interconnect assembly shown in FIG. 5 (plus the area of the local interface 414 for mosaic I/O in FIG. 4A) limits the level of integration that can be achieved. The PBC components in FIG. 5 are generally irreducible in size given specific set of wavelengths used in the optical signal. However, interface 414, which can be of conventional construction, can be reduced in size using the moletronic equivalents of the convention transistors, buffers, and other logic elements in interface 414. The resulting molecular electric interface serves the same functions as the conventional implementation including conversion of a binary bits stream from the photodetector 430 to the parallel bit streams used in molecular tiles 412 and conversion of the parallel bit streams from molecular tiles 412 into a serial bit streams appropriate for modulator 440. A co-owned U.S. patent application Ser. No. 10/233,232, filed Aug. 30, 2002, entitled "Configurable Molecular Switch Array" by Gregory S. Snider, Philip J. Kuekes, and R. Stanley Williams further describes molecular logic that may be used in interface 414.

The massively parallel signaling architectures described above generally can be scaled to nanometer scales. For example, in a system having K identical waveguides, each having a total of N=Q/2 drop/add filter pairs, the nth mosaic, which supported by the nth drop/add filter pair of resonators, on every waveguide can use the same resonant frequency $v_n$. Therefore, to distinguish the signal intended for the nth mosaic on waveguide k from those of the other (K−1) waveguides, the signals for K mosaics can be encoded onto a single channel with frequency $v_n$. Hence, the total number of memory and/or logic mosaics supported by this system of interconnects is N·K. Clearly, mosaic k on each waveguide must be assigned a unique encoding (or "fingerprint") so that the signal intended for mosaic k on channel n can be distinguished from the other K−1 mosaics encoded on channel n.

If a given mosaic can support a maximum data I/O rate B and the modulation bandwidth that can be applied to each channel is at least K·B (and that the transmission window of the drop/add filter resonators satisfies $\pi v_0/Q > KB$), the total throughput of the system is N·K·B. This approach allows us to access all mosaics in parallel without any foreknowledge of the physical location of any mosaic. Additional multiplexing is achieved simply by adding mosaics.

With a BER "overhead" of 10× to compensate for unanticipated losses in a practical nanophotonic interconnect assembly, and operation at a full throughput of 1 Tb/s at a wavelength of approximately 1 μm, the minimum power needed (integrated over all photodetectors) is 60 mW. With a RCE detection efficiency of 50%, and 1024 waveguides (supplied by a 10-stage binary splitter system with a total insertion loss of $\log_2(1024)\times 0.1$ dB or 1 dB), each with a non-resonant insertion loss of 63%, the entire system needs only 420 mW of input optical power. Even at this power, cross-phase modulation is weak enough to neglect over the cm-scale distances that would be used in the system.

Figure 7:
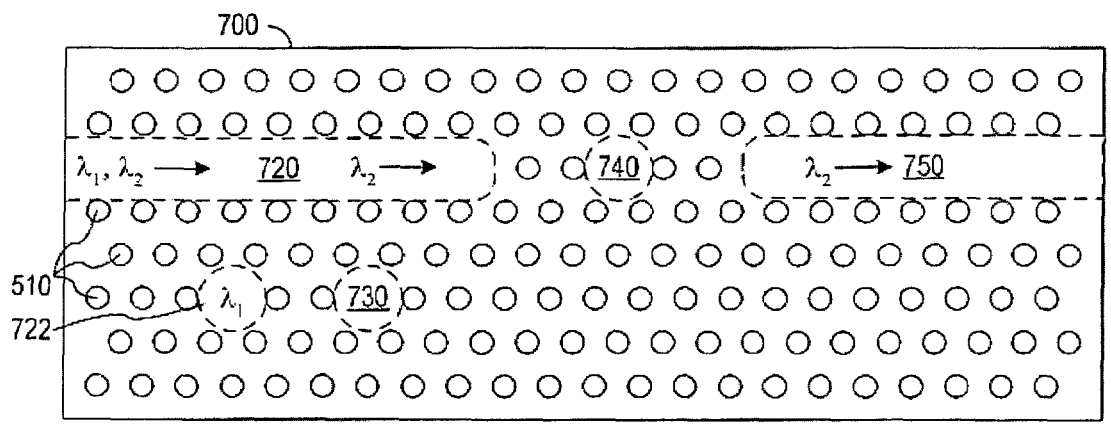
FIG. 7 shows a photonic bandgap crystal containing components of optical I/O system suitable for an embodiment of the invention including a single mosaic.

Although embodiments of the invention described above provide I/O for circuits containing multiple mosaics of moletronic circuits, the capacitance of metal interconnects connecting a single mosaic to other distant electronic components may also significantly slow the operating speed of the mosaic. FIG. 7 illustrates a nanophotonic interconnect system 700 using PBC technology to improve signaling performance for a device containing a single moletronic mosaic. System 700 uses an optical signal having only two frequency channels in the WDM scheme. An input frequency channel corresponding to a wavelength $\lambda_1$ is for input signals (e.g., representing write data for a moletronic memory), and an output frequency channel corresponding to wavelength $\lambda_2$ is for output signals (e.g., representing read data from a moletronic memory).

System 700 includes a PBC with a line defect 720 acting as an input waveguide and an adjacent point defect 722 acting as a drop filter for frequency channel having wavelength $\lambda_1$. Point defect 722 preferably creates a strongly coupled resonator having a Q factor greater than about 1,000. Accordingly, point defect 722 may remove the frequency channel corresponding to wavelength $\lambda_1$ from input waveguide 720. A photodetector for the input signal is fabricated at a point defect 730 that is adjacent to point defect 722. Point defect 730 preferably creates a resonator for wavelength $\lambda_1$ with a Q factor of about 10 to 100. Electric leads (not shown) connect the photodetector to an electronic interface (not show) for the mosaic.

The frequency channel corresponding to wavelength $\lambda_2$ is unmodulated when input to waveguide 720, and wavelength $\lambda_2$ is sufficiently distinct from wavelength $\lambda_1$ that frequency channel passes point defect 722 with little power loss. Insertion loss for wavelength $\lambda_1$ after the extraction and photodetection is acceptable since wavelength $\lambda_1$ is not required in the output optical signal. Accordingly, the modulator can be fabricated at a point defect 740 directly in the path of the optical signal passing through the photonic interface. The point defect 740 for the modulator is adjacent to the end of line defect 720, which forms the input waveguide. Electric leads (not shown) connect the electronic interface of the mosaic to the electrodes (not shown) of the modulator. When a base voltage (e.g., zero volts) is applied the electrodes of the modulator, point defect 740 acts as a resonator having a high Q, preferably greater than about 1,000, for wavelength $\lambda_2$. With the high Q, the frequency channel corresponding to wavelength $\lambda_2$ strongly couples from the input waveguide into point defect 740 and from point defect 740 into a line defect 750 forming an output waveguide. The Q factor for point defect 740 forming the RCE modulator changes rapidly with changes in the applied voltage as described above, permitting the output frequency channel to be modulated as required to represent output information.

Figure 8:
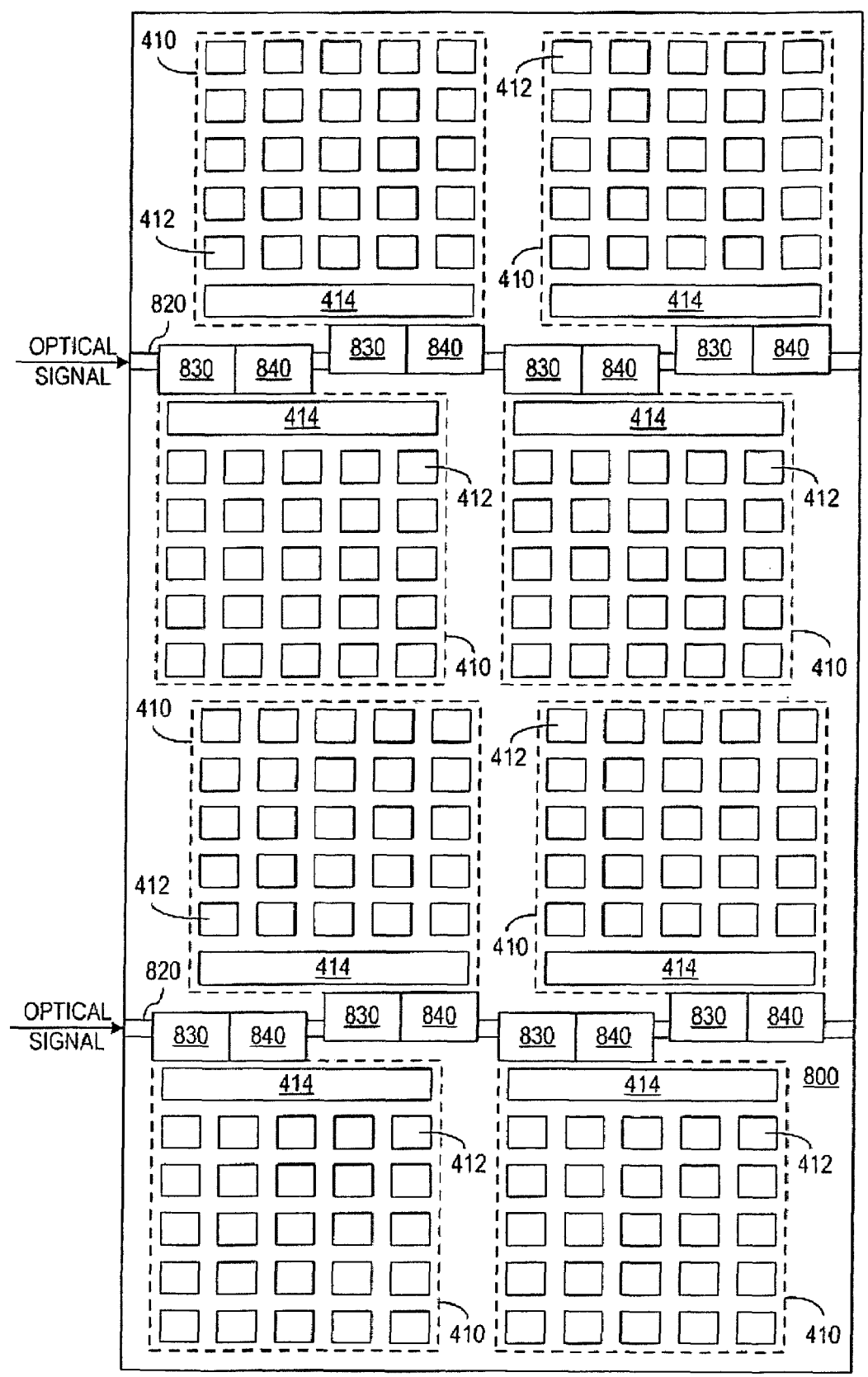
FIG. 8 is a block diagram of an integrated circuit containing an optical I/O system in accordance with another embodiment of the invention using molecular components in waveguides.

FIG. 8 illustrates a device 800 that uses a photonic interface similar to that of device 400 of FIG. 4A but which substitutes molecular drop/add filter pairs, modulators, and detectors for their PBC equivalents in device 400. In device 800, detectors 830 and modulators 840 are roughly molecular in size and directly integrated into waveguides 820. Detectors 830 are preferably non-demolition detectors that minimize insertion loss.

Figure 9:
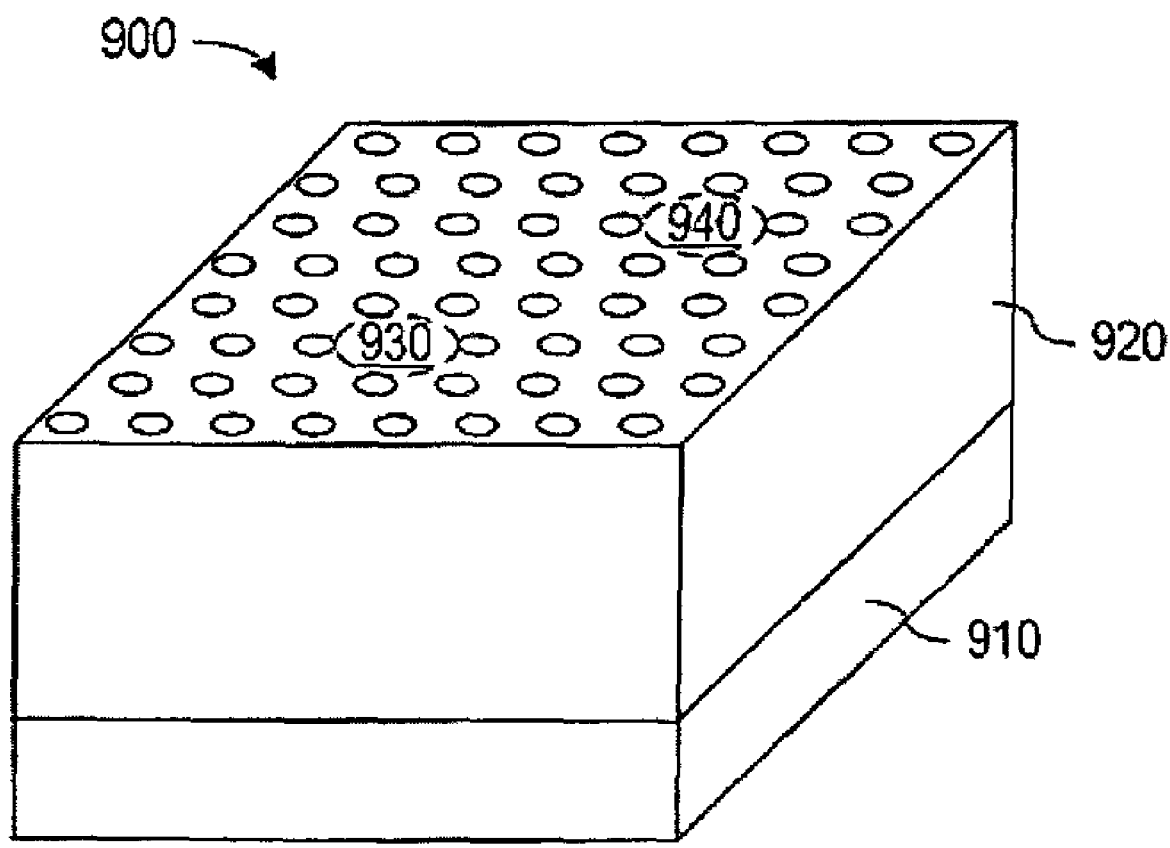
FIG. 9 shows a moletronic circuit having a photonic interface in accordance with an embodiment of the invention.

Another embodiment of the invention could be applied for communication with a small (e.g., a few cubic microns) autonomous molecular device such as a sensor. FIG. 9 illustrates an example of a device 900 including a multi-component integrated moletronic circuit 910 fabricated on one side of a 3-dimension photonic bandgap crystal 920. Moletronic circuit 910 can perform any function, and in one specific embodiment moletronic circuit 910 is a sensor for specific chemicals. The 3-dimensional photonic bandgap crystal 920 includes two embedded point defects 930 and 940 forming an RCE photodiode and a RCE modulator such as illustrated by structure 650 of FIG. 6B, and the photodiode and modulator provide an I/O interface for device 900. The photodiode can also be used to extract electrical power for operation of moletronic circuit 910.

Overall, device 900 can have a largest dimension that is smaller than a few microns, which is small enough to float freely in air. In operation of device 900, a powerful remote two-wavelength laser (not shown) could be directed at device 900 and control signals could be encoded (or modulated) onto one wavelength for resonance and detection by the PBC photodetector corresponding to point defect 930. The modulator uses the second frequency from the laser beam to encode an output signal. The design of the PBC would ideally retroreflect the modulated output back toward the source laser, but any output direction that is different from the direction of the input beam would be sufficient to permits reception of the output signal from device 900.

With the embodiment of the invention illustrated in FIG. 9, the interface between moletronic circuit 910 and the PBC input/output resonators 930 and 940 are preferably molecular in nature to minimize overall size. For example, a DPLL circuit, for example, used in an interface such as interface 414 of FIG. 4A when applied in device 900 may be implemented using molecular electronics. Molecular components for the interface, e.g., the serial to parallel converters and the DPLL, are disclosed in: U.S. Pat. No. 6,459,095, entitled "Chemically Synthesized and Assembled Electronic Devices", issued to James R. Heath et al. on Oct. 1, 2002; U.S. Pat. No. 6,314,019, entitled "Molecular Wire Crossbar Interconnect (MWCI) for Signal Routing and Communications", issued to Philip J. Kuekes et al. on Nov. 6, 2001; application Ser. No. 09/280,045, entitled "Molecular Wire Crossbar Logic (MWCL)", filed on Mar. 29, 1999, in the names of Philip J. Kuekes et al.; U.S. Pat. No. 6,128,214, entitled "Molecular Wire Crossbar Memory", issued to Philip J. Kuekes et al. on Oct. 3, 2000; and U.S. Pat. No. 6,256,767, entitled "Demultiplexer for a Molecular Wire Crossbar Network", issued to Philip J. Kuekes et al on Jul. 3, 2001, all assigned to the same assignee as the present application.

In accordance with yet another aspect of the invention, the photonic signaling systems are employed for moletronic circuits implementing classical circuit functions in the above-described embodiments of the invention can instead be employed in quantum systems that manipulate quantum states (e.g., representing qubits, qudits, or qunits.) One such application has the same structure as illustrated in FIG. 4A in the case where moletronic tiles 412 manipulate quantum states, and interface 414 distribute classical signals to all of the moletronic tiles 412 in the array in parallel for parallel manipulation of quantum states in all or some of moletronic tiles 412. In another application of the architecture of FIG. 4A, the photonic signals on waveguide 420 represent quantum information, and interface 414 either routes the selected photon signals to moletronic tiles 412 or convert the photonic signals to a form suitable for moletronic tiles 412.

The architecture of FIG. 4A has several advantages for use in quantum information processing. In particular, an integrated circuit 400 being small (e.g., having sub-micron feature sizes) is relatively easy to cool to low temperatures (e.g., near absolute zero). Further, IC 400 does not require connected wires for signaling. This avoids Johnson noise, and eliminates a significant source of heat injection. IC 400 can therefore be maintained at low temperature, which reduces decoherence that would otherwise interrupt quantum processing. An IC is also a manufacturable form for a commercial product.

One specific application is for optical pulse control of electron-spin-based semiconductor quantum computers. (See Pazy et al, Europhys Lett. 62, 175-181, 2003.) In this implementation, each qubit is represented by the spin of a single electron in a quantum dot. Single-qubit and two-qubit logical operations are implemented by applying classical optical control pulses to particular quantum dots. This implementation combines the best of quantum optics and spintronics including: the very precise control provided by lasers (and the availability of resonance-fluorescence measurements), and the long spin coherence times of electrons in semiconductors. An application of the architecture of FIG. 4A to an electron-spin-based semiconductor quantum computer could send a laser control pulse (i.e., a classical signal) that a drop-filter 422 extracts for application to target quantum dot 412 and thereby cause the target quantum dot 412 to perform a logic operation on that qubit, or between that qubit and a qubit in a neighboring quantum dot 412. Another application would send a driving laser pulse to a particular qubit to perform a resonance-fluorescence measurement for qubit readout.

In this implementation, complications arise from the necessity of using different wavelengths for different classical information channels. The frequency of the light used generally must correspond to the relevant transitions. For example, the resonant optical frequency of each qubit could be tuned to the same value as that of the local drop/add filter pair. This could be done by changing the physical dimensions of the resonator encapsulating each qubit (quantum dot). Alternatively, a nanoscopic nonlinear frequency conversion process (such as electromagnetically induced transparency) could be employed in interface 414 to convert the incoming frequency to a frequency in all quantum dots 412 in the system. However, another approach entirely would be to fabricate a light source (such as a quantum dot laser that is electrically driven) local to each quantum dot 412. In this case, the architecture nearly identical to the classical system described above, except that each local modulator 440 for a collection of classical logic gates is replaced with a local driving laser for each quantum gate. This gives the advantage of driving many gates with the same drop/add filter pair, providing a very high degree of scaling.

This technique for applying classical control signals to an array of quantum bits can also be used to implement so-called quantum cellular automata quantum computing. (See S. Lloyd, Science 261, 1569 (1993), and S. Benjamin, Phys. Rev. Lett. 88, 017104 (2002)). Here an array of qubits (the simplest form is a linear array of two forms of qubit ABA-BAB, but higher dimensional arrays of more species of qubit can be used) can be globally addressed with external classical signals to effect universal quantum information processing.

The output/read mechanism used for reading classical memory described above can also be used to read quantum memory (in the sense of performing projective quantum measurements). This technique can be used as the final output read stage of a quantum computer, to turn the output register of such a quantum processor into the final classical output.

The performance of projective quantum measurements on select qubits in a quantum array can also be used to implement the quantum circuit model of quantum computation (see R. Raussendorf and H. J. Briegel, Phys. Rev. Lett. 80, 5188 (2001)), whereby an initial cluster state of the qubit array is prepared and the rest of the computation is effected through sequences of projective quantum measurements applied to subsets of the array.

Quantum-coherent transmission of quantum information around a photonic crystal structure would be very useful in scaling a quantum computer. Using this approach, any quantum state can interact with any other quantum state in the quantum device, by exchanging photonic quantum information (where for qubits the information can be encoded in either polarization or the presence or absence of a photon in a single mode). Recently the error thresholds on this sort of communication have been lowered considerably; see Phys. Rev. Lett. 90, 067901 (2003). Provided that very accurate control of qubits within small mosaics of approximately 5 qubits is available—the communication between qubits can be quite noisy (e.g., error rates up to $2/3$ are "tolerable"). Thus the system could be tolerant to the small, inherent, off-resonant losses in the PBC multiplexer.

Once an architecture has been chosen for a classically controlled quantum computer, the exact same physical apparatus can be used to implement a classical computer or hybrid classical/quantum computer. A classical bit can be represented by a qubit, provided the qubit is one of two orthogonal states, for example, in either a |0> or |1> state at the end of each logic operation. For example, using local lasers to manipulate the qubits, the quantum resources can be used to store classical information.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A device comprising:
    an electronic circuit;
    a photonic bandgap crystal;
    a detector at least partially residing in a first defect in the photonic bandgap crystal, wherein the detector converts an input optical signal into an input signal for the electronic circuit; and
    a modulator at least partially residing in a second defect in the photonic bandgap crystal, wherein the modulator is coupled to the electronic circuit and modulates an output optical signal.

2. The device of claim 1, wherein the circuit is a moletronic circuit.

3. The device of claim 1, wherein the first defect and the second defect are each point defects, with the first point defect forming a resonant cavity enhanced photodiode and the second point defect forming a resonant cavity enhanced modulator.

4. The device of claim 1, wherein the device has a size that permits the device to float in air.

5. The device of claim 1, wherein the electronic circuit comprises a chemical sensor.

6. The device of claim 1 wherein the circuit is a quantum information circuit.

7. The device of claim 6 wherein the first defect and the second defect are each point defects, with the first point defect forming a resonant cavity enhanced photodiode and the second point defect forming a resonant cavity enhanced modulator.

8. A device comprising:
an electronic circuit;
a photonic bandgap crystal;
a detector at a first point defect in the photonic bandgap crystal, wherein the detector converts an input optical signal into an input signal for the electronic circuit; and
a modulator at a second point defect in the photonic bandgap crystal, wherein the modulator is coupled to the electronic circuit and modulates an output optical signal.

9. The device of claim 8, wherein the modulator comprises a point defect located between an end of the first line defect and an end of the second line defect.

10. The device of claim 8, further including a point defect associated with the first line defect and with the detector, the point defect acting as a drop filter to remove a frequency channel corresponding to a first wavelength from a multi-channel optical signal and to feed the frequency channel into the first line defect.

11. The device of claim 8, further comprising:
a first line defect in the photonic bandgap crystal,
a second line defect in the photonic bandgap crystal, wherein the modulator receives the output optical signal from the second line defect;
a drop filter between the first line defect and the second line defect, wherein the drop filter operates to extract a wavelength component from a multi-channel optical signal in the first line defect and to feed the wavelength component into the second line defect; and
an add filter adjacent to the modulator and the first line defect, wherein the add filter operates to feed the wavelength component from the modulator to the first line defect.

12. The device of claim 11, wherein the detector is adjacent to the second line defect and the input optical signal to the detector is the wavelength component extracted by the drop filter.

13. A device comprising:
an electronic circuit;
a photonic bandgap crystal;
a detector at a first line defect in the photonic bandgap crystal, wherein the detector converts an input optical signal into an input signal for the electronic circuit; and
a modulator at a second line defect in the photonic bandgap crystal, wherein the modulator is coupled to the electronic circuit and modulates an output optical signal.

* * * * *

UNITED STATES PATENT AND TRADEMARK OFFICE
CERTIFICATE OF CORRECTION

PATENT NO. : 7,546,004 B2 Page 1 of 1
APPLICATION NO. : 12/008554
DATED : June 9, 2009
INVENTOR(S) : Raymond G. Beausoleil et al.

It is certified that error appears in the above-identified patent and that said Letters Patent is hereby corrected as shown below:

On the face page, in field (75), in "Inventors", in column 1, line 6, delete "Richard S. Williams" and insert -- R. Stanley Williams --, therefor.

In column 6, line 46, delete "mote" and insert -- more --, therefor.

In column 8, line 40, delete "$\sigma v_o/Q$" and insert -- $\pi v_o/Q$ --, therefor.

Signed and Sealed this

Thirtieth Day of March, 2010

David J. Kappos
*Director of the United States Patent and Trademark Office*